(12) United States Patent
Panneerselvam et al.

(10) Patent No.: US 9,185,655 B2
(45) Date of Patent: *Nov. 10, 2015

(54) DYNAMIC POWER MODE SWITCH IN A WIRELESS AD-HOC SYSTEM

(71) Applicant: QUALCOMM Incorporated, San Diego, CA (US)

(72) Inventors: Sivakumar Panneerselvam, Chennai (IN); Dhanasekaran Sathyamurthy, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/966,870

(22) Filed: Aug. 14, 2013

(65) Prior Publication Data

US 2013/0329618 A1    Dec. 12, 2013

Related U.S. Application Data

(63) Continuation of application No. 12/705,267, filed on Feb. 12, 2010, now Pat. No. 8,537,733.

(51) Int. Cl.
*H04W 52/02* (2009.01)

(52) U.S. Cl.
CPC ...... *H04W 52/0235* (2013.01); *H04W 52/0216* (2013.01); *H04W 52/0219* (2013.01); *Y02B 60/50* (2013.01)

(58) Field of Classification Search
CPC ............. H04W 52/0235; H04W 52/0216
See application file for complete search history.

(56) References Cited

U.S. PATENT DOCUMENTS

| | | |
|---|---|---|
| 5,754,870 A | 5/1998 | Pollard et al. |
| 6,192,230 B1 | 2/2001 | Van Bokhorst et al. |
| 6,421,714 B1 | 7/2002 | Rai et al. |
| 6,570,857 B1 | 5/2003 | Haartsen et al. |
| 6,580,704 B1 | 6/2003 | Wellig et al. |
| 6,829,493 B1 | 12/2004 | Hunzinger |
| 6,836,472 B2 | 12/2004 | O'Toole et al. |

(Continued)

FOREIGN PATENT DOCUMENTS

| | | |
|---|---|---|
| EP | 2157739 A1 | 2/2010 |
| WO | 2012078379 A1 | 6/2012 |
| WO | 2013134389 | 9/2013 |

OTHER PUBLICATIONS

"IN Application No. 1177/MUM/2009 First Examiner Report", Sep. 11, 2014, 3 pages.

(Continued)

*Primary Examiner* — Albert T Chou
(74) *Attorney, Agent, or Firm* — DeLizio Law, PLLC

(57) ABSTRACT

In ad-hoc wireless networks, functionality can be implemented to dynamically enable/disable an ad-hoc power save mode depending on whether or not the WLAN device is in a continuous traffic environment. The WLAN devices in the ad-hoc wireless network can use beacon frames to transmit a power mode switch request, to respond to a received power mode switch request (to indicate acceptance or rejection of the received power mode switch request), and to indicate a power mode switch status. The WLAN devices switch the power mode if all the WLAN devices in the ad-hoc wireless network accept the power mode switch request. Changing the power mode depending on the environment can improve power savings, data throughput, and reliability.

40 Claims, 9 Drawing Sheets

(56) References Cited

U.S. PATENT DOCUMENTS

| | | |
|---|---|---|
| 7,260,068 B2 | 8/2007 | Hsieh et al. |
| RE40,032 E | 1/2008 | Van Bokhorst et al. |
| 7,457,271 B2 | 11/2008 | Donovan |
| 7,457,973 B2 | 11/2008 | Liu |
| 7,505,795 B1 | 3/2009 | Lim et al. |
| 7,567,815 B2 | 7/2009 | Nishikawa et al. |
| 7,577,114 B2 | 8/2009 | Hsieh et al. |
| 7,634,275 B2 | 12/2009 | Odman |
| 7,751,356 B2 | 7/2010 | Kim et al. |
| 7,804,849 B2 | 9/2010 | Mahany et al. |
| 7,864,720 B2 | 1/2011 | Jeyaseelan |
| 7,881,755 B1 | 2/2011 | Mishra et al. |
| 7,916,663 B2 | 3/2011 | Yee |
| 7,978,638 B2 | 7/2011 | Kim et al. |
| 7,995,507 B2 | 8/2011 | Singh et al. |
| 8,014,370 B2 | 9/2011 | Banerjea et al. |
| 8,023,522 B2 | 9/2011 | Gobriel et al. |
| 8,045,494 B2 | 10/2011 | Habetha et al. |
| 8,064,474 B2 | 11/2011 | Lynch et al. |
| 8,072,913 B2 | 12/2011 | Desai |
| 8,089,964 B2 | 1/2012 | Lo et al. |
| 8,094,595 B2 | 1/2012 | Montojo et al. |
| 8,098,635 B2 | 1/2012 | Montojo et al. |
| 8,099,047 B2 | 1/2012 | David et al. |
| 8,112,650 B2 | 2/2012 | Qing et al. |
| 8,233,456 B1 | 7/2012 | Kopikare |
| 8,233,462 B2 | 7/2012 | Walton et al. |
| 8,526,346 B1 | 9/2013 | Liu |
| 8,537,733 B1 * | 9/2013 | Panneerselvam et al. .... 370/311 |
| 8,542,620 B2 | 9/2013 | Sampathkumar |
| 8,576,761 B1 | 11/2013 | Pitchaiah |
| 8,588,156 B1 | 11/2013 | Liu |
| 8,611,268 B1 | 12/2013 | Thandaveswaran |
| 8,744,496 B2 | 6/2014 | Cave et al. |
| 8,755,313 B2 | 6/2014 | Damnjanovic et al. |
| 9,049,658 B2 | 6/2015 | Ponmudi et al. |
| 9,137,838 B2 | 9/2015 | Liu |
| 2002/0045435 A1 | 4/2002 | Fantaske |
| 2002/0164963 A1 | 11/2002 | Tehrani et al. |
| 2004/0085972 A1 | 5/2004 | Warren et al. |
| 2004/0259542 A1 | 12/2004 | Viitamaki et al. |
| 2005/0135284 A1 | 6/2005 | Nanda et al. |
| 2005/0136914 A1 | 6/2005 | Van Kampen et al. |
| 2005/0152324 A1 | 7/2005 | Benveniste |
| 2005/0286454 A1 | 12/2005 | Morimoto et al. |
| 2006/0029024 A1 | 2/2006 | Zeng et al. |
| 2006/0292987 A1 | 12/2006 | Ophir et al. |
| 2007/0057767 A1 * | 3/2007 | Sun et al. .................... 340/7.35 |
| 2007/0077936 A1 | 4/2007 | Tomisawa et al. |
| 2007/0082688 A1 | 4/2007 | Tu et al. |
| 2007/0171910 A1 | 7/2007 | Kumar et al. |
| 2007/0183393 A1 | 8/2007 | Boyd et al. |
| 2007/0248066 A1 | 10/2007 | Banerjea et al. |
| 2008/0069021 A1 | 3/2008 | Chhabra |
| 2008/0095134 A1 | 4/2008 | Chen et al. |
| 2009/0016248 A1 | 1/2009 | Li et al. |
| 2009/0034443 A1 | 2/2009 | Walker et al. |
| 2009/0073945 A1 | 3/2009 | Seok |
| 2009/0097438 A1 | 4/2009 | Kneckt et al. |
| 2009/0196211 A1 | 8/2009 | Wentink |
| 2009/0279467 A1 | 11/2009 | Ji |
| 2009/0296615 A1 | 12/2009 | Kim et al. |
| 2009/0310578 A1 | 12/2009 | Convertino et al. |
| 2009/0312073 A1 | 12/2009 | Park et al. |
| 2010/0061272 A1 | 3/2010 | Veillette |
| 2010/0070767 A1 | 3/2010 | Walker et al. |
| 2010/0093378 A1 | 4/2010 | Chin et al. |
| 2010/0118797 A1 | 5/2010 | Park et al. |
| 2010/0128701 A1 | 5/2010 | Nagaraja |
| 2010/0153727 A1 | 6/2010 | Reznik et al. |
| 2010/0189021 A1 | 7/2010 | He et al. |
| 2010/0246591 A1 | 9/2010 | Gobriel et al. |
| 2010/0254290 A1 | 10/2010 | Gong et al. |
| 2010/0284316 A1 | 11/2010 | Sampathkumar |
| 2010/0304780 A1 * | 12/2010 | Chung et al. ................. 455/522 |
| 2010/0325459 A1 | 12/2010 | Kangude et al. |
| 2011/0051638 A1 | 3/2011 | Jeon et al. |
| 2011/0086662 A1 | 4/2011 | Fong et al. |
| 2011/0122835 A1 | 5/2011 | Naito et al. |
| 2011/0158142 A1 | 6/2011 | Gong et al. |
| 2011/0161697 A1 | 6/2011 | Qi et al. |
| 2011/0237294 A1 | 9/2011 | Hussain |
| 2011/0280170 A1 * | 11/2011 | Bowser et al. ................. 370/311 |
| 2012/0021735 A1 | 1/2012 | Maeder et al. |
| 2012/0151089 A1 | 6/2012 | Ponmudi et al. |
| 2013/0028206 A1 | 1/2013 | Cho et al. |
| 2013/0201936 A1 | 8/2013 | Chen et al. |
| 2013/0204936 A1 | 8/2013 | El Khayat et al. |
| 2013/0238919 A1 | 9/2013 | Ponmudi et al. |
| 2013/0315121 A1 | 11/2013 | Sampathkumar |
| 2014/0237156 A1 | 8/2014 | Regula et al. |
| 2014/0269692 A1 | 9/2014 | Flynn et al. |

OTHER PUBLICATIONS

"U.S. Appl. No. 12/727,610 Final Office Action", Nov. 4, 2014, 18 pages.
"U.S. Appl. No. 14/049,661 Office Action", Sep. 19, 2014, 11 Pages.
"U.S. Appl. No. 13/413,011 Office Action", Jul. 30, 2014, 15 Pages.
"Peer-to-Peer Technical Group, Peer-to-Peer Technical Specification", Revision 1.0, 105 Pages.
"U.S. Appl. No. 12/727,610 Final Office Action", Jul. 7, 2014, 17 pages.
"U.S. Appl. No. 12/963,160 Final Office Action", Jul. 30, 2014, 21 Pages.
Co-pending U.S. Appl. No. 13/955,779, filed Jul. 31, 2013, 44 pages.
Co-pending U.S. Appl. No. 12/705,267, filed Feb. 12, 2010.
Co-pending U.S. Appl. No. 14/049,661, filed Oct. 9, 2013,32 pages.
Co-pending U.S. Appl. No. 12/562,819, filed Sep. 18, 2009.
Co-pending U.S. Appl. No. 12/727,610, filed Mar. 19, 2010.
Co-pending U.S. Appl. No. 12/768,434, filed Apr. 27, 2010.
Co-pending U.S. Appl. No. 12/963,160, filed Dec. 8, 2012.
Co-pending U.S. Appl. No. 12/768,912, filed Apr. 28, 2010.
Co-pending U.S. Appl. No. 13/088,081, filed Apr. 15, 2011.
Co-pending U.S. Appl. No. 13/413,011, filed Mar. 6, 2012.
IEEE Standard for Information Technology-Telecommunications and Information exchange Between systems—Local and Metropolitan area networks—Specific requirements, Part 11: Wireless LAN Meddium Access Control (MAC) and Physical Layer (PHY) specifications Amendment 7: Extensions to Direct-Link Setup (DLS) Standard, IEEE, Piscataway, NJ, USA, Oct. 14, 2010. Aug. 20, 1999, pp. 1-122.
IEEE Standard for Information technology-Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) http://standards.ieee.org/getieee802/download/802.11-2007.pdf. (Date Obtained from Internet Oct. 21, 2009) Jun. 12, 2007 , pp. 59-312.
IEEE Standard for Information technology-Telecommunications and information exchange between systems—Local and metropolitan area networks—Specific requirements—Part 11: Wireless LAN Medium Access Control (MAC) and Physical Layer (PHY) Specifications, IEEE Std 802.11-2007 (Revision of IEEE Std 802.11-1999) Section 11; http://standards.ieee.org/getieee802/download/802.11-2007.pdf. (Date Obtained from Internet Apr. 6, 2010) Jun. 12, 2007, pp. 468-517.
"U.S. Appl. No. 12/727,610 Office Action", Dec. 5, 2013 , 16 pages.
"IEEE Std 802.11z: IEEE Standard for Information Technology—Amendment 7: Extensions to Direct-Link Setup", IEEE.Computer Society 3 Park Avenue New York, NY 10016-5997 http://ieeexplore.ieee.org/xpl/freeabsalljsp"amumber=5605400 Oct. 14, 2010 , 96 pages.
IEEE, "Wireless LAN Medium Access Control (MAC) and Physical Layer (PHY) Specifications", IEEE Standard for Information Technology Section 11.0, http://standards.ieee.org/getieee802/downtoad/802.11-2007.pdf Jun. 12, 2007, pp. 419-468.

(56) References Cited

OTHER PUBLICATIONS

IEEE, "Wireless LAN Medium Access Control (MAC) and Physical Layer (PHY) Specifications", IEEE Standard for Information Technology Section 7.0, http://standards.ieee.org/getieee802/downtoad/802.11-2007.pdf Jun. 12, 2007, pp. 59-154.
International Search Report and Written Opinion—PCT/US2011/062154—ISA/EPO—Mar. 6, 2012.
International Search Report and Written Opinion—PCT/US2013/029377—ISA/EPO—Jun. 17, 2013.
Jung Eun-Sun et al., "A Power Control MAC Protocol for Ad Hoc Networks", 2002, 12 pages.
PCT Application No. PCT/US11/62154 International Preliminary Report on Patentability, Jun. 20, 2013, 8 pages.
U.S. Appl. No. 12/492,405 Office Action, Mar. 15, 2012, 9 pages.
U.S. Appl. No. 12/492,405 Office Action, Sep. 27, 2012, 10 Pages.
U.S. Appl. No. 12/562,819 Final Office Action, May 3, 2012, 32 pages.
U.S. Appl. No. 12/562,819 Office Action, Feb. 5, 2013, 29 pages.
"U.S. Appl. No. 12/562,819 Office Action",Nov. 14, 2011, 26 pages.
U.S. Appl. No. 12/705,267 Office Action, Mar. 22, 2012, 11 pages.
U.S. Appl. No. 12/727,610 Final Office Action, Jan. 7, 2013, 24 pages.
U.S. Appl. No. 12/727,610 Office Action, Aug. 2, 2012, 20 Pages.
U.S. Appl. No. 12/768,434 Final Office Action, Mar. 20, 2013, 15 pages.
U.S. Appl. No. 12/768,434 Office Action, Oct. 15, 2012, 11 pages.
U.S. Appl. No. 12/768,912 Final Office Action, Feb. 22, 2013, 27 pages.
U.S. Appl. No. 12/768,912 Office Action, Sep. 7, 2012, 23 Pages.
U.S. Appl. No. 12/963,160 Office Action, Apr. 16, 2013, 25 Pages.
U.S. Appl. No. 13/088,081 Non-Final Office Action, Apr. 24, 2013, 14 Pages.
"U.S. Appl. No. 12/963,160 Final Office Action", Aug. 15, 2013, 19 pages.
"U.S. Appl. No. 12/963,160 Office Action", Jan. 6, 2014, 20 pages.
"U.S. Appl. No. 13/955,779 Office Action", May 13, 2015, 21 pages.
"U.S. Appl. No. 13/955,779 Final Office Action", Aug. 31, 2015, 26 pages.

\* cited by examiner

DYNAMIC POWER MODE SWITCH IN A WIRELESS AD-HOC SYSTEM

RELATED APPLICATIONS

This application is a continuation of U.S. application Ser. No. 12/705,267 filed Feb. 12, 2010.

BACKGROUND

Embodiments of the inventive subject matter generally relate to the field of wireless communications and, more particularly, to a dynamic power mode switch technique in a wireless ad-hoc network.

Wireless devices implement power saving mechanisms to conserve battery power and reduce energy consumption. In an ad-hoc wireless local area network (WLAN), a wireless device generates unicast and/or multicast announcement traffic indication map (ATIM) frames to notify other wireless devices of pending data transfers. The ATIM frames are transmitted in an ATIM window. The wireless devices that receive the ATIM frames remain in an active state to receive the data. The wireless devices that do not receive the ATIM frames enter into a sleep mode or an inactive state after the ATIM window ends.

SUMMARY

Various embodiments for a dynamic power mode switch technique in an ad-hoc wireless network are disclosed. In one embodiment, a first wireless network device of an ad-hoc wireless network transmits a power mode switch request to a plurality of wireless network devices of the ad-hoc wireless network in response to determining that a power mode of the first wireless network device should be changed. The first network device determines whether to change the power mode of the first wireless network device based, at least in part, on power mode switch responses received from the plurality of wireless network devices responsive to the power mode switch request. The first network device transmits, to the plurality of wireless network devices, a notification including a predefined value that indicates whether to change or maintain a corresponding power mode of each of the plurality of wireless network devices based, at least in part, on determining whether to change the power mode of the first wireless network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
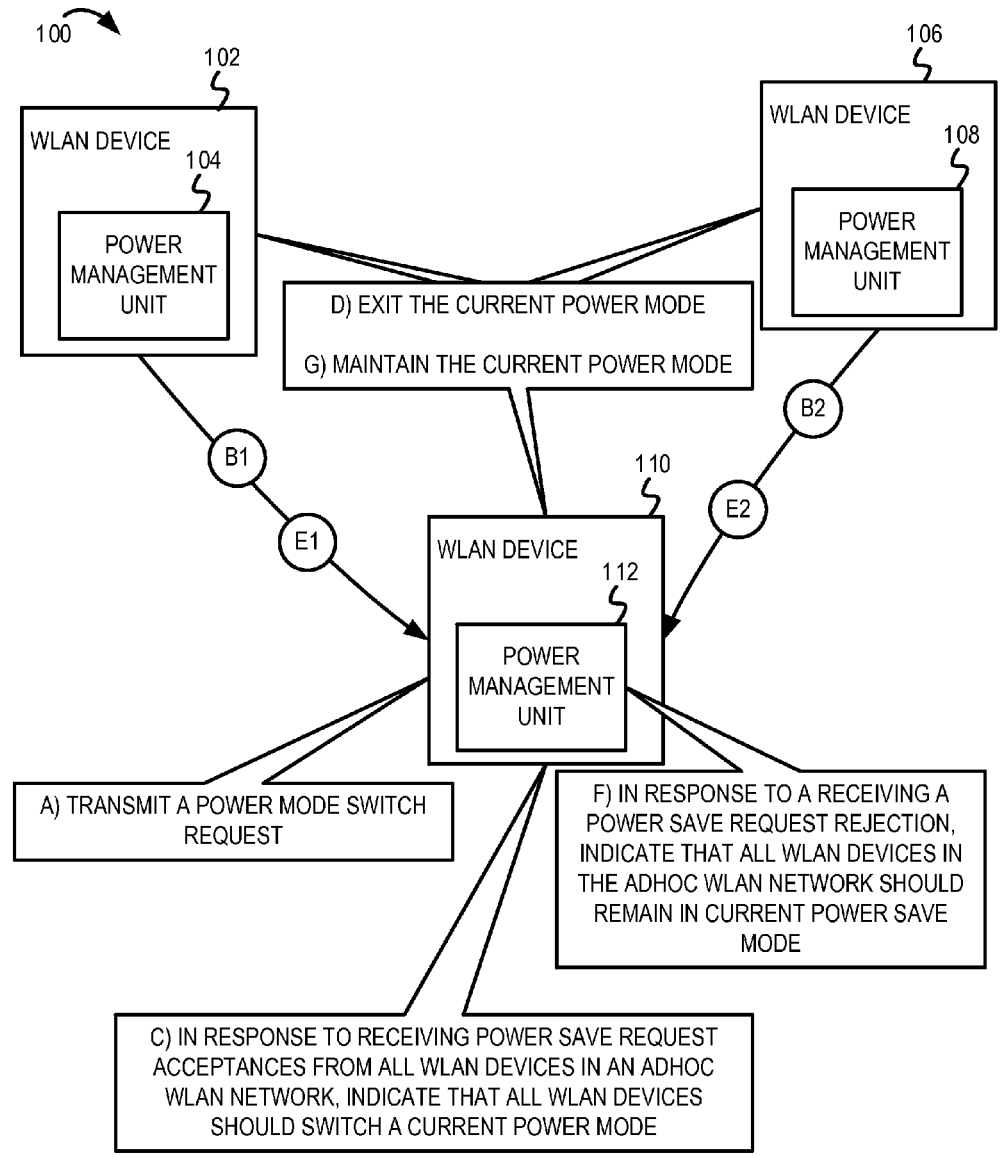
FIG. 1 is an example conceptual diagram illustrating a dynamic power mode switching mechanism.

The description that follows includes exemplary systems, methods, techniques, instruction sequences, and computer program products that embody techniques of the present inventive subject matter. However, it is understood that the described embodiments may be practiced without these specific details. For instance, although examples refer to a dynamic power mode switching mechanism for wireless local area network (WLAN) devices, the dynamic power mode switching mechanism can be implemented by other standards and devices, e.g., Bluetooth®, WiMAX, ZigBee®, Wireless USB devices, etc. In other instances, well-known instruction instances, protocols, structures, and techniques have not been shown in detail in order not to obfuscate the description.

In an ad-hoc wireless 802.11 network, an ATIM frame serves as an indication of a pending data transfer. A WLAN device in the ad-hoc wireless 802.11 network typically implements an ad-hoc power save mode, whereby the WLAN device enters an inactive state if the WLAN device does not receive the ATIM frame during a pre-determined time interval (e.g., an ATIM window in a beacon interval). In continuous traffic environments and high traffic environments, the WLAN device in the ad-hoc wireless 802.11 network may not enter the inactive state. Thus, the ad-hoc power save mode may not be very effective and may result in low throughput and poor performance of the WLAN device. Moreover, the ad-hoc power save mode does not allow the WLAN device to switch from a power save enabled mode to a power save disabled mode in the continuous traffic environment. This can result in the WLAN device switching between an active state and the inactive state too frequently, resulting in poor power saving and poor performance.

Data throughput and data transfer reliability can be improved in the WLAN device by implementing a mechanism to dynamically switch to a power mode that is conducive to the ad-hoc wireless 802.11 network environment. Functionality can be implemented to enable or disable the ad-hoc power save mode depending on whether or not WLAN devices are in a continuous traffic environment. In some embodiments, an initiating WLAN device can initiate a power mode switch by transmitting a power mode switch request in a multicast ATIM frame and a beacon frame. Other WLAN devices in the ad-hoc wireless 802.11 network can similarly transmit beacon frames to indicate acceptance or rejection of the power mode switch request. The initiating WLAN device can indicate success or failure of the power mode switch request based on responses to the power mode switch request. Accordingly, the WLAN devices in the ad-hoc wireless 802.11 network may (e.g., for a successful power mode switch request) or may not (e.g., for a failed power mode switch request) enable/disable the ad-hoc power save mode. This allows a smooth transition to an appropriate power mode depending on the environment (e.g., a high traffic environment). Disabling the ad-hoc power save mode in the continuous traffic environment also improves data throughput and reliability.

FIG. 1 is an example conceptual diagram illustrating a dynamic power mode switching mechanism. FIG. 1 depicts an ad-hoc wireless 802.11 network ("ad-hoc WLAN) 100 comprising a WLAN device 102, a WLAN device 106, and a WLAN device 110. Each of the WLAN devices 102, 106, and 110 respectively comprises power management units 104, 108, and 112. The power management units 104, 108, and 112 implement functionality to request a switch from a current power mode ("power mode switch request"), and accept/reject power mode switch requests from other devices.

At stage A, the power management unit 112 in the WLAN device 110 ("initiating WLAN device") transmits a power mode switch request. At stage A, in some embodiments, the power management unit 112 sets a power management (PM) flag in a multicast ATIM frame and transmits the multicast ATM frame to the other WLAN devices 102 and 106 in the ad-hoc WLAN 100. In one implementation, the PM flag indicates a power management state of the WLAN device. Setting the PM flag (e.g., PM=1) can indicate that the WLAN device is in an active state. Additionally, the power management unit 112 also sets a power management acceptance (PMA) field in a beacon frame. In one embodiment, the PMA field may be part of IBSS parameters in a frame control sequence (FCS) field of the beacon frame. In one example, the power management unit 112 sets the PMA flag to a predefined value (e.g., 0x80) to indicate the power mode switch request within the beacon frame. The initiating WLAN device 110 then transmits the beacon frame to all listening WLAN devices 102 and 106 to indicate the power mode switch request. In some implementations, the power management unit 112 may transmit the power mode switch request in response to determining that the ad-hoc WLAN 100 is in a continuous traffic or a high traffic environment. In a continuous traffic or high traffic environment, the power management unit 112 may transmit the power mode switch request to disable ad-hoc power save mode. Transmitting the power mode switch request in the beacon frame can help ensure that all WLAN devices in the ad-hoc WLAN 100 receive the power mode switch request. Transmitting the power mode switch request in the beacon frame can also help ensure that WLAN devices currently not in the ad-hoc WLAN 100, but that intend to join the ad-hoc WLAN 100, can receive the power mode switch request.

At stage B1, the power management unit 104 in the WLAN device 102 indicates acceptance of the power mode switch request. The power management unit 104 may accept the power mode switch request on determining that the WLAN device 102 will continuously transmit data to or receive data from other WLAN devices. For example, the power management unit 104 may accept the power mode switch request to disable the ad-hoc power save mode and to maximize throughput in the high traffic environment. The power management unit 104 can set a PMA field in a beacon frame of the WLAN device 102 to indicate acceptance of the power mode switch request. In one implementation, the power management unit 104 may set the PMA field to a predefined value (e.g., 0x01) to indicate the acceptance of the power mode switch request. By indicating the acceptance of the power mode switch request, the power management unit 104 indicates that the WLAN device 102 will switch its current power mode.

At stage B2, the power management unit 108 in the WLAN device 106 indicates acceptance of the power mode switch request. As described above, the power management unit 108 may accept the power mode switch request to maximize throughput in the high traffic environment. The power management unit 108 can set a PMA field in a beacon frame of the WLAN device 106 to indicate the acceptance of the power mode switch request. In one implementation, the power management unit 108 may set the PMA field to a predefined value (e.g., 0x01) to indicate acceptance of the power mode switch request.

At stage C, the power management unit 112 in the initiating WLAN device 110 indicates that all the WLAN devices in the ad-hoc WLAN 100 should switch from a current power mode ("successful power mode reset"). The power management unit 112 may indicate that the WLAN devices 102, 106, and 110 should switch from the current power mode in response to receiving an acceptance of the power mode switch request from all WLAN devices in the ad-hoc WLAN 100. The power management unit 112 may set the PMA field in a beacon frame transmitted by the WLAN device 110 to indicate that that all the WLAN devices in the ad-hoc WLAN 100 should switch from the current power mode. For example, the power management unit 112 may set the PMA field to a predefined value (e.g., 0x00) to indicate the successful power mode reset. The initiating WLAN device 110 then transmits the beacon frame to all the listening WLAN devices.

At stage D, the power management units 104, 108, and 112 cause the WLAN devices 102, 106, and a 110, respectively, to exit the current power mode. For example, the power management units 104, 108, and 112 cause the respective WLAN devices 102, 106, and 110 to exit the ad-hoc power save mode and to disable the ad-hoc power save mode. Exiting the ad-hoc power save mode ensures that the WLAN devices 102, 106, and 110 in the ad-hoc WLAN 100 do not enter the sleep mode during periods of continuous traffic. In other words, exiting the ad-hoc power save mode ensures that the WLAN devices 102, 106, and 110 are always in an active state to receive/transmit data to other WLAN devices in the ad-hoc network.

Stages E1, E2, F, and G illustrate a separate scenario where at least one WLAN device in the ad-hoc WLAN 100 does not respond to or rejects the power mode switch request (transmitted at stage A).

At stage E1, the power management unit 104 in the WLAN device 102 indicates acceptance of the power mode switch request. As described above, the power management unit 104 can set a PMA field in a beacon frame of the WLAN device 102 to indicate the acceptance of the power mode switch request.

At stage E2, the power management unit 108 in the WLAN device 106 indicates rejection of the power mode switch request. In one example, the power management unit 108 may reject the power mode switch request (to disable the ad-hoc power save mode) on determining that the WLAN device 106 will not transmit data to or receive data from other WLAN devices in the ad-hoc WLAN 100. For example, the power management unit 108 may access a transmit data buffer, determine that the WLAN device 106 will not transmit data to another WLAN device, and determine that the WLAN device 106 will enter a sleep mode. The power management unit 108 can set a PMA field in a beacon frame of the WLAN device 106 to indicate rejection of the power mode switch request. In one implementation, the power management unit 108 may set the PMA field to a predefined value (e.g., 0x0F) to indicate the rejection of the power mode switch request. As another example, the power management unit 108 may not be configured to recognize and to interpret the PMA field, may not set the PMA field, and may therefore ignore the power mode switch request. As another example, the power management unit 108 may receive the power mode switch request and may choose to ignore (and therefore to reject) the power mode switch request by setting the PMA field to a predefined value (e.g., 0x00).

At stage F, the power management unit 112 in the initiating WLAN device 110 indicates that the WLAN devices in the ad-hoc WLAN 100 should remain in the current power mode ("failed power mode reset"). The power management unit 112 may indicate that the WLAN devices 102, 106, and 110 should not switch from the current power mode in response to receiving the rejection of the power mode switch request from any one of the listening WLAN devices, e.g., the WLAN device 106. The power management unit 112 may set a PMA field in a beacon frame to indicate that that all the WLAN devices in the ad-hoc WLAN 100 should remain in the current power mode. For example, the power management unit 112 may set the PMA field to a predefined value (e.g., 0xFF) to indicate the failed power mode reset. The initiating WLAN device 110 then transmits the beacon frame to all the listening WLAN devices.

At stage G, the power management units 104, 108, and 112 maintain the current power mode in the respective WLAN devices 102, 106, and 110. For example, the power management units 104, 108, and 112 may maintain the ad-hoc power save mode in their respective WLAN devices 102, 106, and 110. The WLAN devices 102, 106, and 110 continue to operate in the ad-hoc power save mode, whereby the receiving WLAN device enters the sleep mode, if the receiving WLAN device does not receive either the unicast or the multicast ATIM frame during the ATIM window.

Figure 2:
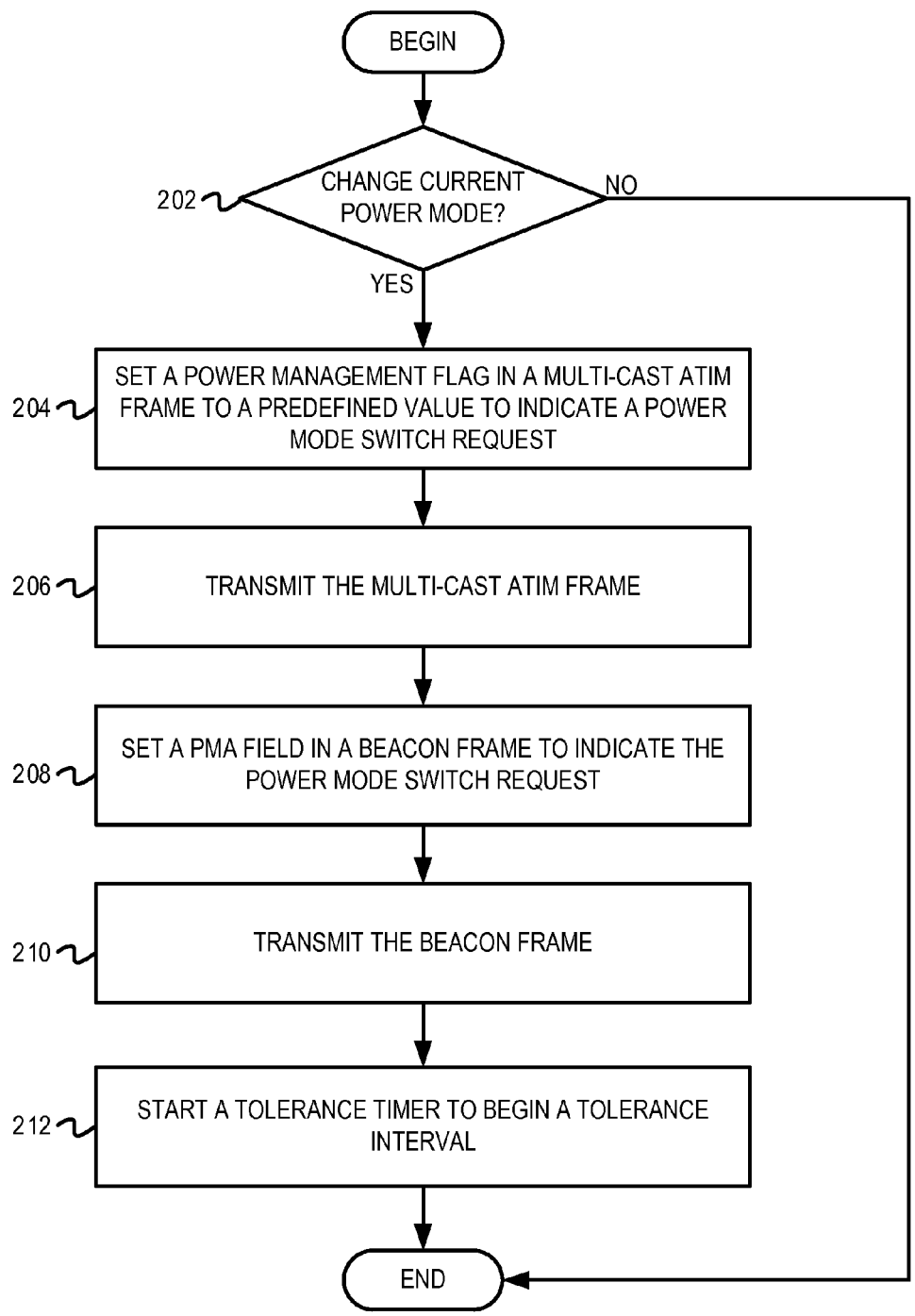
FIG. 2 is a flow diagram illustrating example operations for transmitting a power mode switch request.

FIG. 2 is a flow diagram illustrating example operations for transmitting a power mode switch request. Flow 200 begins at block 202.

At block 202, it is determined whether a current power mode should be changed. For example, the power management unit 112 of an initiating WLAN device 110 (shown in FIG. 1) may determine whether the current power mode should be changed. For example, the current power mode may be an ad-hoc power save mode, whereby the WLAN device 110 enters a sleep mode if the WLAN device 110 does not receive an ATIM frame during an ATIM window in a beacon interval. The power management unit 112 may determine that the WLAN device 110 should disable the ad-hoc power save mode in response to determining that the WLAN device 110 is in a high traffic/continuous traffic network. If the power management unit 112 determines that the current power mode should be changed, the flow continues at block 204. Otherwise, the flow ends.

At block 204, a power management (PM) flag in a multicast ATIM frame is set to a predefined value to indicate a power mode switch request. For example, the power management unit 112 sets the PM flag to 0x01 in the multicast ATIM frame. The multicast ATIM frame is typically transmitted to notify peer WLAN devices in an ad-hoc WLAN of pending data transfers. The PM flag is a part of a frame control sequence (FCS) field in the ATIM frame. Setting the PM flag to 0x01 can indicate that receiving WLAN devices should not enter the sleep mode because of the pending data transfers. Setting the PM flag to 0x01 can also indicate a power mode switch request. In one implementation, setting the PM flag to 0x01 can indicate a request to switch the current power mode. For example, if the ad-hoc power save mode is enabled, setting the PM flag to 0x01 can be an indication to disable the ad-hoc power save mode. As another example, if the ad-hoc power save mode is disabled, setting the PM flag to 0x01 can be an indication to enable the ad-hoc power save mode. The flow continues at block 206.

At block 206, the multicast frame ATIM frame is transmitted. For example, the WLAN device 110 transmits the multicast ATIM frame to WLAN devices 102 and 106 in the ad-hoc WLAN 100. All the WLAN devices in the ad-hoc WLAN 100 receive the multicast ATIM frame, read the PM flag in the multicast ATIM frame, and accordingly determine whether to enable or disable the current power mode, as will be further described below with reference to FIG. 3. The flow continues at block 208.

At block 208, a power management acceptance (PMA) field in a beacon frame is set to a predefined value to indicate a power mode switch request. For example, the power management unit 112 of the initiating WLAN device 110 sets the PMA field in the beacon frame to 0x80. The PMA field in the beacon frame serves as an alternate power mode switch request (in addition to the PM flag in the ATIM frame). The PMA field enables WLAN devices that did not receive the ATIM frame to receive the power mode switch request in the beacon frame. In one example, the PMA field may be part of a frame control sequence (FCS) field in the beacon frame. The FCS field in the beacon frame comprises optional fields for independent basic service set (IBSS) parameters to indicate parameters (e.g., length of an ATIM window) of the ad-hoc WLAN 100. In one example, the default value of the PMA field may be 0x00. The value of the PMA field may be changed to indicate a power mode switch request, or to respond to a power mode switch request received from another device. In one implementation, the PMA field can be an unsigned character data field. In another implementation, the PMA field can be an integer data field or other suitable data field. In one implementation, the power management unit 112 can set the PMA field to 0x80 to indicate the power mode switch request. In another implementation, the power management unit 112 can set the PMA field to another suitable predefined value that indicates a pending power mode switch request. The flow continues at block 210.

At block 210, the beacon frame is transmitted. For example, the WLAN device 110 transmits the beacon frame. Transmitting the power mode switch request in the beacon frame can ensure that all the WLAN devices in the ad-hoc WLAN 100 and all WLAN devices in the vicinity of the initiating WLAN device 110 receive the power mode switch request. The flow continues at block 212.

At block 212, a tolerance timer is started to begin a tolerance interval. For example, the power management unit 112 starts the tolerance timer to begin the tolerance interval. The tolerance interval indicates a maximum time interval that the power management unit 112 will wait to receive a response to the power mode switch request. In one embodiment, the tolerance interval is dependent on a number of WLAN devices in the ad-hoc WLAN 100 and a beacon interval of the WLAN devices. For example, the tolerance interval can be set as a product of the number of WLAN devices in the ad-hoc WLAN and the beacon interval. The tolerance interval can help ensure that all the WLAN devices in the ad-hoc WLAN have an opportunity to gain control of a communication medium (e.g., a WLAN communication channel) to transmit the response to the power mode switch request. From block 212, the flow ends.

It should be noted that, although FIG. 2 depicts the power management unit 112 of the initiating WLAN device 110 starting the tolerance interval after the beacon frame is transmitted, in some implementations, the power management unit 112 may start the tolerance interval after the multicast ATIM frame is transmitted. The initiating WLAN device 110 may continue normal operations (e.g., transmitting data, receiving data, transmitting beacon frames, etc.) while waiting for responses to the power mode switch request. The initiating WLAN device 110 may also listen for beacon frames from other WLAN devices in the ad-hoc WLAN 100 and for indications of acceptance/rejection of the power mode switch request. The initiating WLAN device 110 may continue to transmit beacon frames with the PMA field set to 0x80 and multicast ATIM frames with the PM flag set to 0x01 until the tolerance interval expires. The initiating WLAN device 110 may change the value of the PMA field in the beacon frame to indicate a successful power mode reset or a failed power mode reset after the tolerance interval expires, as will be further described below with reference to FIG. 4.

Figure 3:
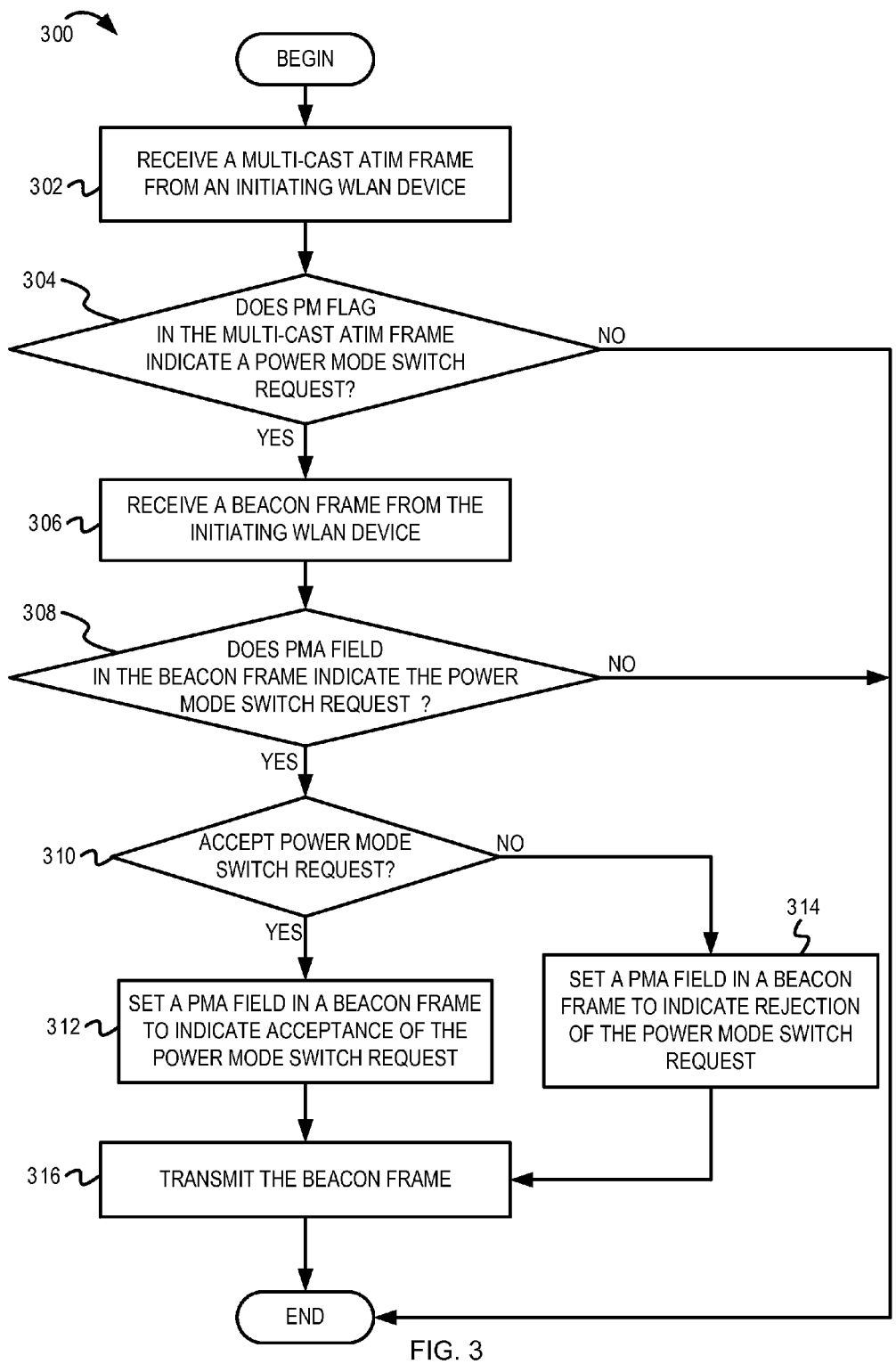
FIG. 3 is a flow diagram illustrating example operations of a WLAN device for transmitting a response to a power mode switch request.

FIG. 3 is a flow diagram illustrating example operations of a WLAN device for transmitting a response to a power mode switch request. Flow 300 begins at block 302.

At block 302, a receiving WLAN device receives a multicast ATIM frame from an initiating WLAN device. For example, the receiving WLAN device 102 shown in FIG. 1 receives the multicast ATIM frame from the initiating WLAN device 110. In some embodiments, all the WLAN devices in the ad-hoc WLAN are synchronized with a common timestamp. This can help ensure that the WLAN devices in the ad-hoc WLAN are in an active state during beacon generation (e.g., during a beacon interval) and are in the active state to receive beacon frames from other WLAN devices in the ad-hoc WLAN. The flow continues at block 304.

At block 304, it is determined whether a power management (PM) flag in the multicast ATIM frame is set to a predefined value that indicates power mode switch request. For example, the power management unit 104 in the receiving WLAN device 102 determines whether the PM flag in the multicast ATIM frame is set to 0x01. The PM flag being set to 0x01 can indicate a request from the initiating WLAN device 110 to change or swap a current power mode. For example, on receiving the multicast ATIM frame with the PM flag set to 0x01, the power management unit 104 can determine whether the WLAN device 102 should enable/disable an ad-hoc power save mode. If the power management unit 104 determines that the power management flag in the multicast ATIM frame is set to the predefined value that indicates the power mode switch request, the flow continues at block 306. Otherwise, the flow ends.

At block 306, a beacon frame is received from the initiating WLAN device. For example, the receiving WLAN device 102 receives the beacon frame from the initiating WLAN device 110. The flow continues at block 308.

At block 308, it is determined whether a PMA field in the received beacon frame is set to a predefined value that indicates the power mode switch request. For example, the power management unit 104 in the receiving WLAN device 102 determines whether the PMA field in the received beacon frame is set to 0x80. The PMA field in the received beacon frame being set to 0x80 indicates the power mode switch request. For example, the PMA field in the received beacon frame being set to 0x80 indicates a request that all WLAN devices in the ad-hoc WLAN 100 should disable the ad-hoc power save mode. If the power management unit 104 determines that the PMA field in the received beacon frame is set to the predefined value that indicates the power mode switch request, the flow continues at block 310. Otherwise, the flow ends.

At block 310, it is determined whether the power mode switch request should be accepted. For example, the power management unit 104 in the receiving WLAN device 102 determines whether the power mode switch request should be accepted. For example, the power management unit 104 may determine that the power mode switch request should be rejected based on determining that the WLAN device 102 is not configured to disable the ad-hoc power save mode. If it is determined that the power mode switch request should be accepted, the flow continues at block 314. Otherwise, the flow continues at block 312.

At block 312, a PMA field in a beacon frame is set to a predefined value to indicate acceptance of the power mode switch request. For example, the receiving WLAN device 102 creates the beacon frame. The power management unit 104 in the receiving WLAN device 102 sets the PMA field in the beacon frame to 0x01 to indicate the acceptance of the power mode switch request. In other words, the power management unit 104 indicates to the initiating WLAN device 110 that the receiving WLAN device 102 will change the current power mode if all other WLAN devices in the ad-hoc WLAN 100 accept the power mode switch request. The flow continues at block 316.

At block 314, the PMA field in the beacon frame is set to a predefined value to indicate rejection of the power mode switch request. The flow 300 moves from block 310 to block 314 if the power management unit 104 determines that the power mode switch request should be rejected. For example, the receiving WLAN device 102 creates the beacon frame. The power management unit 104 in the receiving WLAN device 102 sets the PMA field in the beacon frame to 0x0F to indicate rejection of the power mode switch request. In other words, the power management unit 104 indicates to the initiating WLAN device 110 that the receiving WLAN device 102 will not change the current power mode. The flow continues at block 316.

At block 316, the beacon frame is transmitted. For example, the receiving WLAN device 102 transmits the beacon frame. The initiating WLAN device 110 receives the beacon frame and reads the PMA field to determine the receiving WLAN device's response to the power mode switch request. The initiating WLAN device 110 accordingly determines whether a successful or a failed power mode reset notification should be issued, as will be described with reference to FIG. 4. From block 316, the flow ends.

Figure 4:
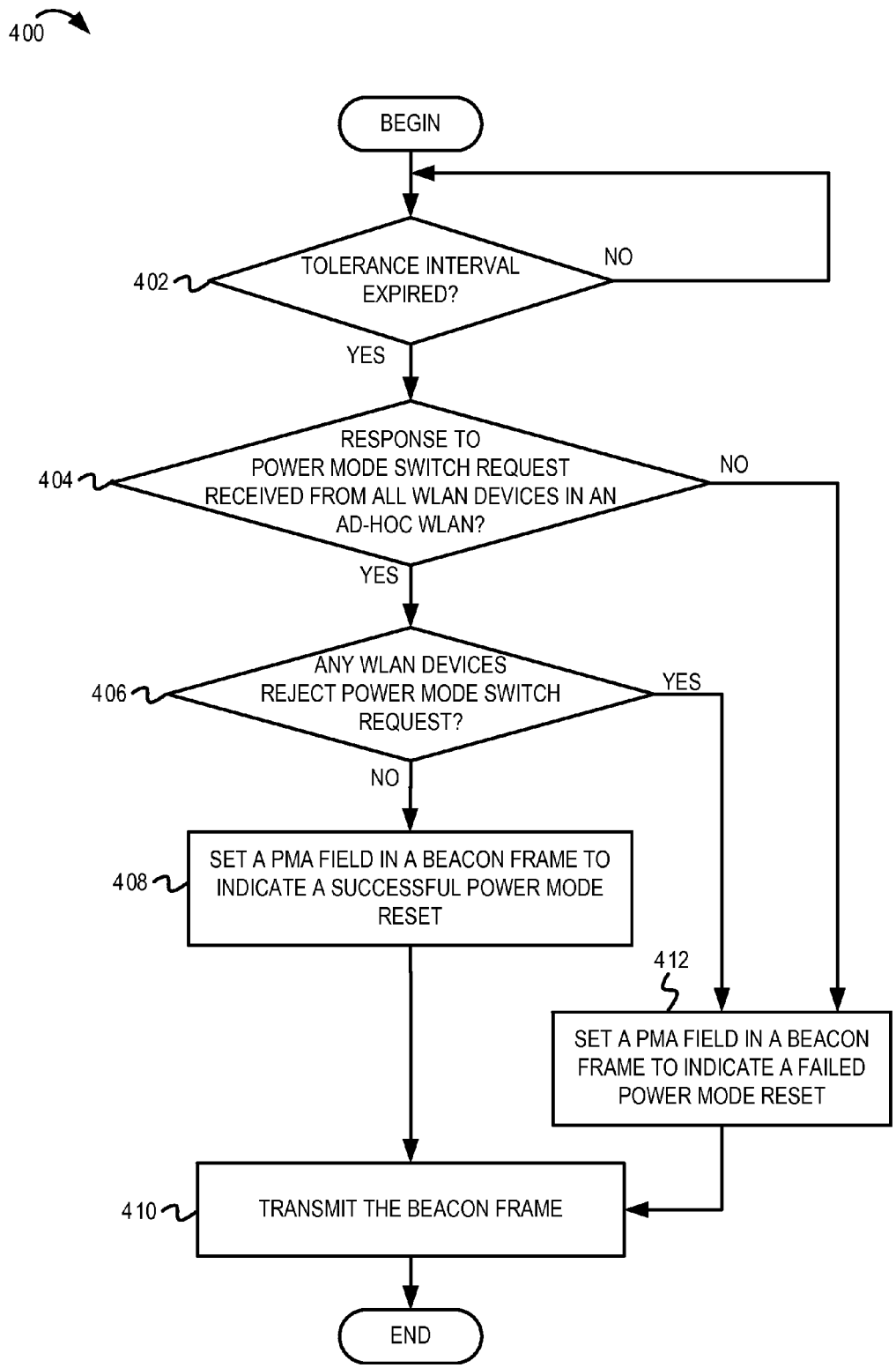
FIG. 4 is a flow diagram illustrating example operations for analyzing responses to a power mode switch request.

FIG. 4 is a flow diagram illustrating example operations for analyzing responses to a power mode switch request. Flow 400 begins at block 402.

At block 402, it is determined whether a tolerance interval has expired. For example, a power management unit 112 of the initiating WLAN device 110 determines whether the tolerance interval has expired. In one implementation, the power management unit 112 may begin the tolerance interval after transmitting a beacon frame with the power mode switch request. In another implementation, the power management unit 112 may begin the tolerance interval after transmitting a multicast ATIM frame with the power mode switch request. If the power management unit 112 determines that the tolerance interval has expired, the flow continues at block 404. If the power management unit 112 determines that the tolerance interval has expired, the power management unit 112 may also change a PMA field in subsequent beacon frames to indicate a successful/failed power mode reset (as described below). Otherwise, the flow loops back to block 402, where the power management unit 112 listens for beacon frames from other WLAN devices in an ad-hoc WLAN 100 and determines whether the tolerance interval has expired.

At block 404, it is determined whether a response to the power mode switch request has been received from all WLAN devices in the ad-hoc WLAN. For example, the power management unit 112 of the initiating WLAN device 110 can determine whether the response to the power mode switch request has been received from all the WLAN devices in the ad-hoc WLAN, based on a number of WLAN devices in the ad-hoc WLAN and a number of beacon frames received. If it is determined that the response to the power mode switch request has been received from all the WLAN devices in the ad-hoc WLAN, the flow continues at block 406. Otherwise, the flow continues at block 412.

At block 406, it is determined whether any of the WLAN devices in the ad-hoc WLAN reject the power mode switch request. For example, the power management unit 112 of the initiating WLAN device 110 can determine whether any of the WLAN devices reject the power mode switch request. The power management unit 112 may analyze beacon frames received within the tolerance interval to determine whether at least one of the WLAN devices rejects or ignores the power mode switch request. For example, the power management unit 112 may read a PMA field in each of the received beacon frames to determine whether the value of the PMA field is set to either 0x0F (indicating a rejected power mode switch request) or a 0x00 (indicating an ignored power mode switch request). If it is determined that at least one of the WLAN devices reject the power mode switch request, the flow continues at block 412. Otherwise, the flow continues at block 408.

At block 408, a PMA field in a beacon frame is set to a predefined value to indicate a successful power mode reset. For example, the power management unit 112 of the initiating WLAN device 110 sets the PMA field in the beacon frame to 0x00 to indicates the successful power mode reset. Setting the PMA field to 0x00 also indicates that all other WLAN devices in the ad-hoc WLAN should change the current power mode beginning at a next beacon interval. For example, the power management unit 112 may set the PMA field to 0x00 to indicate that all WLAN devices in the ad-hoc WLAN should disable the ad-hoc power save mode beginning at the beacon interval. The flow continues at block 410.

At block 412, the PMA field in the beacon frame is set to a predefined value to indicate a failed power mode reset. The flow 400 moves from block 406 to block 412 if the power management unit 112 determines that at least one of the WLAN devices in the ad-hoc WLAN rejects/ignores the power mode switch request. The flow 400 also moves from block 404 to block 412 if the power management unit 112 determines that at least one of the WLAN devices in the ad-hoc WLAN has not transmitted a response to the power mode switch request within the tolerance interval. For example, the power management unit 112 of the initiating WLAN device 110 sets the PMA field in the beacon frame to 0xFF to indicate the failed power mode reset. Setting the PMA field to 0xFF instructs other WLAN devices in the ad-hoc WLAN to not change the current power mode. For example, setting the PMA field to 0xFF can instruct other WLAN devices in the ad-hoc WLAN to retain the current power mode and to ignore power mode switch requests. The flow continues at block 410.

At block 410, the beacon frame is transmitted. For example, the initiating WLAN device 110 transmits the beacon frame indicating the successful power mode reset or the failed power mode reset. From block 410, the flow ends.

Figure 5:
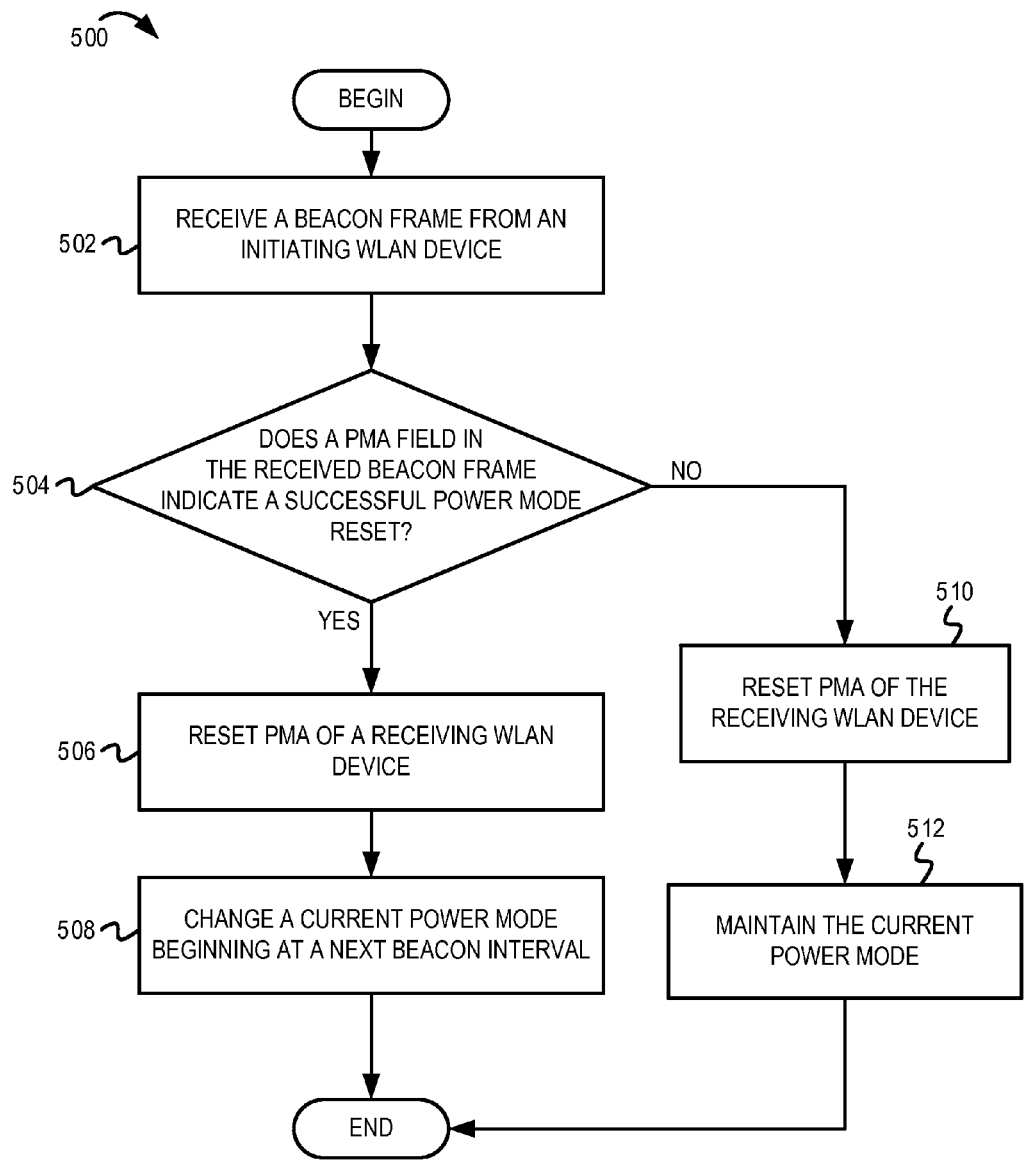
FIG. 5 is a flow diagram illustrating example operations in a receiving WLAN device for changing the power mode based on an indication from an initiating WLAN device.

FIG. 5 is a flow diagram illustrating example operations in a receiving WLAN device for changing the power mode based on an indication from an initiating WLAN device. Flow 500 begins at block 502.

At block 502, a receiving WLAN device receives a beacon frame ("received beacon frame") from an initiating WLAN device. For example, the receiving WLAN device 102 (shown in FIG. 1) receives the beacon frame from the initiating WLAN device 110. The flow continues at block 504.

At block 504, it is determined whether a PMA field in the received beacon frame is set to a predefined value indicating a successful power mode reset. For example, the power management unit 104 of the receiving WLAN device 102 determines whether the PMA field in the received beacon frame is set to 0x00. The PMA field being set to 0x00 indicates a successful power mode reset and indicates that the receiving WLAN device 102 should change a current power mode beginning at a next beacon interval. The PMA field being set to 0xFF indicates a failed power mode reset and indicates that the receiving WLAN device 102 should not change the current power mode. If the power management unit 104 determines that the PMA field in the received beacon frame is set to the predefined value that indicates the successful power mode reset, the flow continues at block 506. Otherwise, the flow continues at block 510.

At block 506, a PMA field in a subsequent beacon frame of the receiving WLAN device is reset. For example, the power management unit 104 in the receiving WLAN device 102 sets the PMA field in the subsequent beacon frame. Resetting the PMA field once a notification of the successful power mode reset is received can indicate that no power mode switch requests/responses are being transmitted. Resetting the PMA field once a notification of the successful power mode reset is received can also help avoid confusion between previously transmitted/received power mode switch requests/responses. The flow continues at block 508.

At block 508, a current power mode is changed beginning at the next beacon interval. In one implementation, the power management unit 104 of the receiving WLAN device 102 changes the current power mode in the WLAN device 102. For example, if an ad-hoc power save mode is enabled, on receiving an indication of the successful power mode reset, the power management unit 104 may disable the ad-hoc power save mode in the receiving WLAN device 102. As another example, if the ad-hoc power save mode is disabled, on receiving the indication of the successful power mode reset, the power management unit 104 may enable the ad-hoc power save mode in the receiving WLAN device 102. The power management unit 104 may cause processing units in the WLAN device 102 to change the current power mode. In one implementation, the power management unit 104 may, after each ATIM window, configure the processing units (e.g., by transmitting a message to appropriate processing units, etc.) to remain in an active state or to switch to an inactive state as required. For example, based on receiving the indication of the successful power mode reset, the power management unit 104 may determine that the ad-hoc power save mode should be disabled. Thus, after each ATIM window, the power management unit 104 may notify the processing units to remain in the active state. From block 508, the flow ends.

At block 510, the PMA field in the subsequent beacon frame of the receiving WLAN device is reset. The flow 500 moves from block 504 to block 510 on determining that the PMA field in the received beacon frame indicates a failed power mode reset. For example, the power management unit 104 in the receiving WLAN device 102 sets the PMA field in the subsequent beacon frame of the receiving WLAN device to 0x00 (e.g., to indicate that no power mode switch requests or responses are being transmitted, etc.). The flow continues at block 512.

At block 512, the current power mode is maintained. For example, the power management unit 104 in the receiving WLAN device 102 maintains the current power mode in the WLAN device 102. From block 512, the flow ends.

Figure 6:
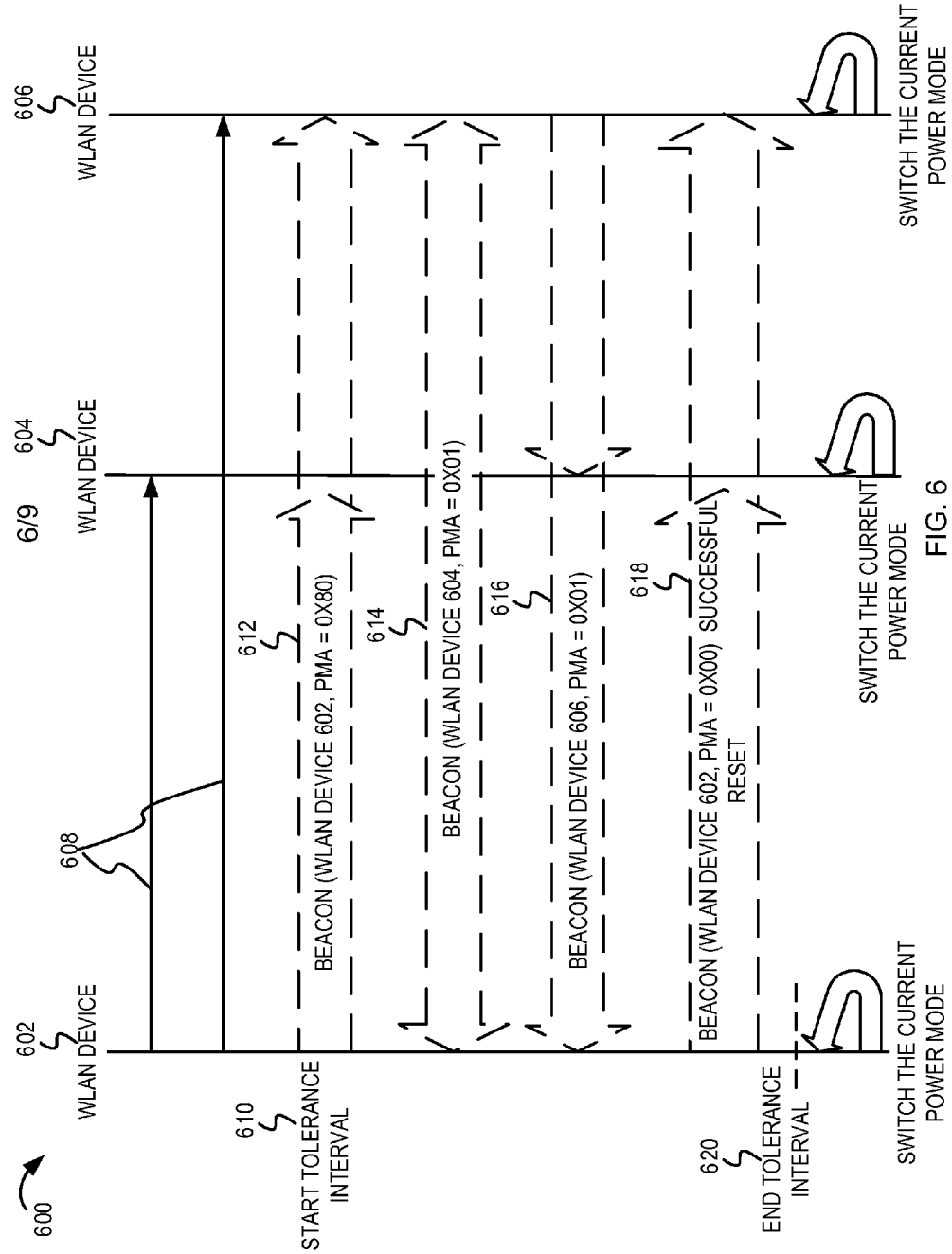
FIG. 6 depicts a sequence diagram illustrating responses to a power mode switch request for a successful power mode reset.

FIG. 6 depicts a sequence diagram illustrating responses to a power mode switch request for a successful power mode reset. FIG. 6 depicts three WLAN devices—WLAN device 602, WLAN device 604, and WLAN device 606. The WLAN device 602 transmits a multicast ATIM frame 608 with a power mode switch request to the WLAN devices 604 and 606. The WLAN device 602 then transmits a beacon frame 612 and sets a PMA field to 0x80 for the power mode switch request in the beacon frame. Additionally, the WLAN device 602 also starts the tolerance interval 610 as described with reference to flow 200 in FIG. 2. On receiving the beacon frame 612 from the WLAN device 602, the WLAN device 604 transmits a beacon frame 614 with a PMA field set to 0x01 to indicate acceptance of the power mode switch request. Likewise, on receiving the beacon frame 612 from the WLAN device 602, the WLAN device 606 transmits a beacon frame 616 with a PMA field set to 0x01 to indicate acceptance of the power mode switch request, as described with reference to flow 300 of FIG. 3. The WLAN device 602 receives the beacon frames 614 and 616 indicating acceptance of the power mode switch request before the tolerance interval expires at 620. The WLAN device 602 transmits a beacon frame 618 indicating a successful power mode reset to the WLAN devices 604 and 606. The WLAN devices 602, 604, and 606 switch their current power mode beginning at a next beacon interval.

Figure 7:
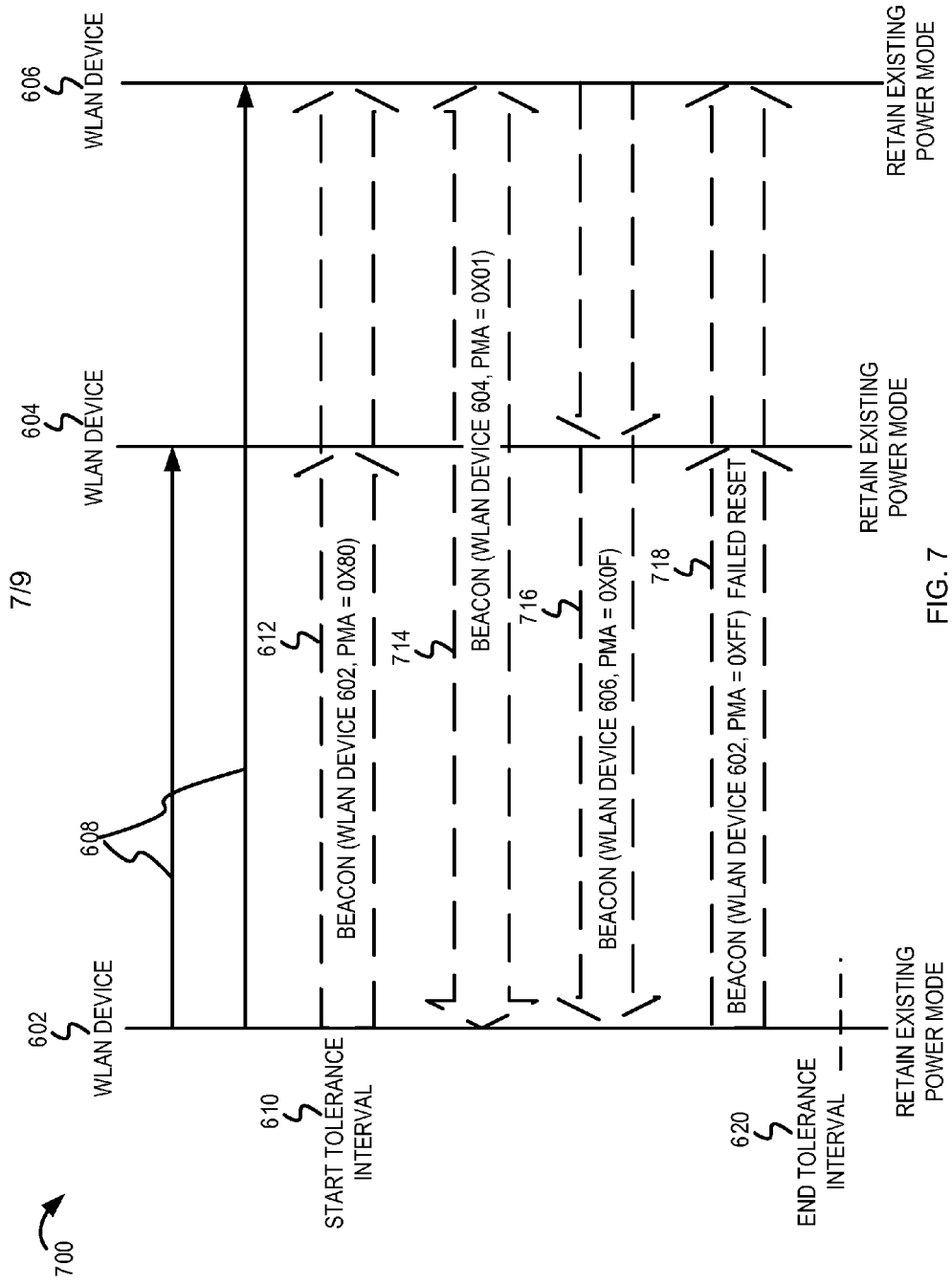
FIG. 7 depicts a sequence diagram illustrating one set of responses to the power mode switch request for a failed power mode reset.

FIG. 7 depicts a sequence diagram illustrating one set of responses to the power mode switch request for a failed power mode reset. As depicted in FIG. 7, in response to receiving the beacon frame 612 with the power mode switch request, the WLAN device 604 transmits a beacon frame 714 with a PMA field set to 0x00 to indicate acceptance of the power mode switch request. However, on receiving the beacon frame 612 from the WLAN device 602, the WLAN device 606 transmits a beacon frame 716 with a PMA field set to 0x0F to indicate rejection of the power mode switch request, as described with reference to flow 300 of FIG. 3. The WLAN device 602 receives the beacon frames 714 and 716 before the tolerance interval expires at 620. The WLAN device 602 analyses the beacon frames 714 and 716 and determines that the WLAN device 606 rejects the power mode switch request. The WLAN device 602 transmits a beacon frame 718 indicating a failed power mode reset to the WLAN devices 604 and 606. On receiving the beacon frame 718, the WLAN devices 602, 604, and 606 retain their existing power mode.

Figure 8:
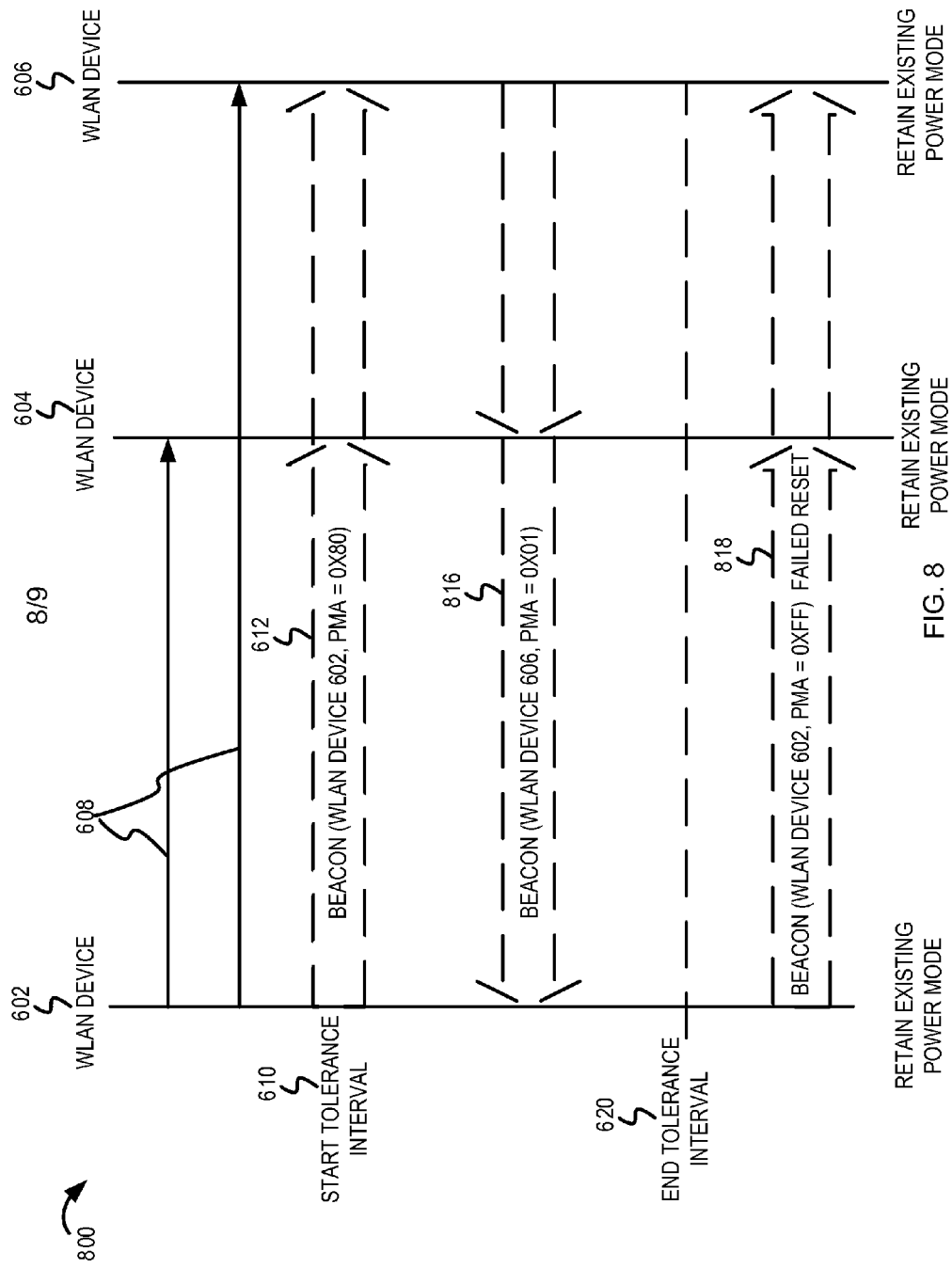
FIG. 8 depicts a sequence diagram illustrating a second set of responses to the power mode switch request for a failed power mode reset.

FIG. 8 depicts a sequence diagram illustrating a second set of responses to the power mode switch request for a failed power mode reset. As depicted in FIG. 8, in response to receiving the beacon frame 612 requesting the power mode switch, the WLAN device 606 transmits a beacon frame 816 with a PMA field set to 0x01 to indicate acceptance of the power mode switch request, as described with reference to flow 300 of FIG. 3. The WLAN device 602 receives the beacon frame 816 before the tolerance interval expires at 620. However, the WLAN device 602 does not receive a beacon frame from the WLAN device 604 indicating acceptance/rejection of the power mode switch request before the tolerance interval expires at 620. The WLAN device 602 considers this as a rejection of the power mode request by the WLAN device 604. The WLAN device 602 transmits a beacon frame 818 indicating a failed power mode reset to the WLAN devices 604 and 606. The WLAN devices 602, 604, and 606 retain their existing power mode.

It should be understood that the depicted diagrams (FIGS. 1-8) are examples meant to aid in understanding embodiments and should not be used to limit embodiments or limit scope of the claims. Embodiments may perform additional operations, fewer operations, operations in a different order, operations in parallel, and some operations differently. For instance, although FIG. 4 depicts the power management unit 112 of the initiating WLAN device 110 determining, after the tolerance interval expires, whether an indication of a successful or failed power mode reset should be transmitted to other WLAN devices in the ad-hoc WLAN, embodiments are not so limited. In some embodiments, the power management unit 112 may analyze the PMA field in each beacon frame as soon as the initiating WLAN device 110 receives the beacon frame from the receiving WLAN device (e.g., from the receiving WLAN device 102). The initiating WLAN device 110 may transmit the beacon frame indicating a failed power mode reset as soon as a beacon frame with a rejected power mode switch request (PMA field=0x0F) is received.

It should be noted that although FIG. 3 depicts the receiving WLAN device 102 receiving both the multicast ATIM frame and the beacon frame, embodiments are not so limited. In some embodiments, the receiving WLAN device 102 may receive either the multicast ATIM frame or the beacon frame. For example, the receiving WLAN device 102 that receives the multicast ATIM frame (but not the beacon frame) with the PM flag set to 0x01 may consider the PM flag set to 0x01 as the power mode switch request and may transmit a beacon frame to indicate acceptance/rejection of the power mode switch request. As another example, the receiving WLAN device 102 that receives the beacon frame (but not the multicast ATIM frame) with the PMA field set to 0x80 may transmit a beacon frame to indicate acceptance/rejection of the power mode switch request. In some implementations, the receiving WLAN device 102 may receive neither the multicast ATIM frame nor the beacon frame. In some implementation, the power management unit 102 in the receiving WLAN device 102 may not have be able to identify/read the PMA field. In these cases, the power management unit 102 may ignore the power mode switch request by transmitting a beacon frame with the PMA field set to 0x00.

Moreover, although FIG. 5 describes the receiving WLAN devices resetting the PMA field in their beacons frames, the initiating WLAN device 110 may also implement the operations of FIG. 5. On determining a successful power mode reset, the initiating WLAN device 110 may also change the current power mode from a next beacon interval. The power management unit 112 in the initiating WLAN device 110 may also reset the PM flag in the multicast ATIM frame. For example, the current power mode in the initiating WLAN device 110 may be the ad-hoc power save mode. In a first beacon interval, the power management unit 112 can transmit a beacon frame and reset the PMA field to 0x00 to indicate a successful power mode reset. The power management unit 112 can also reset the PM flag to 0x00 in the multicast ATIM frame and disable the ad-hoc power save mode at a start of a second beacon interval. Lastly, it should be noted that although FIGS. 1-8 refer to using beacon frames to request and to respond to a power mode switch, in other implementations, other frames (e.g., unicast ATIM frames, multicast ATIM frames, etc.) may be used to request and to respond to the power mode switch.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
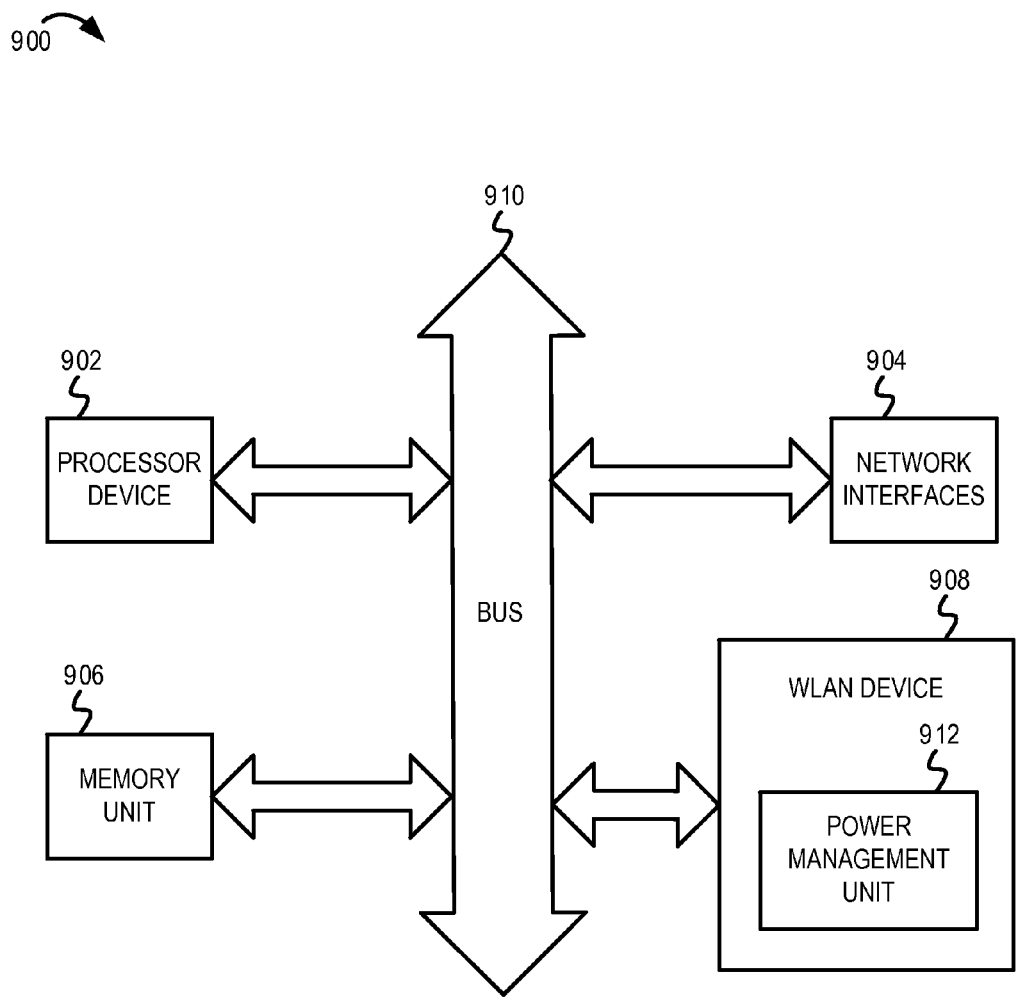
FIG. 9 is a block diagram of one embodiment of an electronic device including a mechanism for dynamic power mode switching.

FIG. 9 is a block diagram of one embodiment of an electronic device 900 including a mechanism for dynamically power mode switching. In some implementations, the electronic device 900 may be one of a personal computer (PC), a laptop, a netbook, a mobile phone, a personal digital assistant (PDA), or other electronic systems comprising a WLAN device. The electronic device 900 includes a processor device 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The user device 900 also includes a bus 910 (e.g., PCI, ISA, PCI-Express, HyperTransport®, InfiniBand®, NuBus, etc.), and network interfaces 904 that include at least one wireless network interface (e.g., a WLAN interface, a Bluetooth® interface, a WiMAX interface, a ZigBee® interface, a Wireless USB interface, etc.).

The electronic device 900 also includes a WLAN device 908. The WLAN device 908 comprises power management unit 912. The power management unit 912 implements functionality for transmitting a power mode switch request, transmitting responses (e.g., acceptances, rejections, etc.) to received power mode switch requests, and/or transmitting an indication of a successful/failed power mode reset based on receiving the responses from other WLAN devices in an ad-hoc WLAN, as described above with reference to FIGS. 1-8. It should be noted that any one of the above-described functionalities might be partially (or entirely) implemented in hardware and/or on the processing unit 902. For example, the functionality may be implemented with an application specific integrated circuit, in logic implemented in the processing unit 902, in a co-processor on a peripheral device or card, etc. Further, realizations may include fewer or additional components not illustrated in FIG. 9 (e.g., additional network interfaces, peripheral devices, etc.). The processor unit 902 and the network interfaces 904 are coupled to the bus 910. Although illustrated as being coupled to the bus 910, the memory 906 may be coupled to the processor unit 902.

While the embodiments are described with reference to various implementations and exploitations, it will be understood that these embodiments are illustrative and that the scope of the inventive subject matter is not limited to them. In general, techniques for dynamic power mode switch in an ad-hoc network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a first wireless network device of an ad-hoc wireless network, in which the first wireless network device transmits a power mode switch request to a plurality of wireless network devices of the ad-hoc wireless network in response to determining that a power mode of the first wireless network device should be changed, the method comprising:
   determining whether to change the power mode of the first wireless network device based, at least in part, on power mode switch responses received from the plurality of wireless network devices responsive to the power mode switch request; and
   transmitting, to the plurality of wireless network devices, a notification including a predefined value that indicates whether to change or maintain a corresponding power mode of each of the plurality of wireless network devices based, at least in part, on said determining whether to change the power mode of the first wireless network device.

2. The method of claim 1, wherein said determining whether to change the power mode of the first wireless network device further comprises:
   receiving an acceptance power mode switch response at the first wireless network device from each of the plurality of wireless network devices; and
   determining to change the power mode of the first wireless network device.

3. The method of claim 1, wherein said determining whether to change the power mode of the first wireless network device further comprises:
   receiving a rejection power mode switch response at the first wireless network device from a second wireless network device of the plurality of wireless network devices; and
   determining to maintain the power mode of the first wireless network device.

4. The method of claim 1, wherein said determining whether to change the power mode of the first wireless network device further comprises:
   determining that a power mode switch response was not received at the first wireless network device from a second wireless network device of the plurality of wireless network devices; and
   determining to maintain the power mode of the first wireless network device.

5. The method of claim 1, wherein said transmitting the notification further comprises:
   receiving an acceptance power mode switch response at the first wireless network device from each of the plurality of wireless network devices; and
   determining to transmit the notification including the predefined value indicating to change the corresponding power mode of each of the plurality of wireless network devices.

6. The method of claim 1, wherein said transmitting the notification further comprises:
   receiving a rejection power mode switch response at the first wireless network device from a second wireless network device of the plurality of wireless network devices; and
   determining to transmit the notification including the predefined value indicating to maintain the corresponding power mode of each of the plurality of wireless network devices.

7. The method of claim 1, wherein said transmitting the notification further comprises:
   determining that a power mode switch response was not received at the first wireless network device from a second wireless network device of the plurality of wireless network devices; and
   determining to transmit the notification including the predefined value indicating to maintain the corresponding power mode of each of the plurality of wireless network devices.

8. The method of claim 1, wherein said transmitting the notification comprises:
   transmitting a beacon frame including a first predefined value indicating to change the corresponding power mode of each of the plurality of wireless network devices, in response to determining to change the power mode of the first wireless network device; and
   transmitting the beacon frame including a second predefined value indicating to maintain the corresponding power mode of each of the plurality of wireless network devices, in response to determining to maintain the power mode of the first wireless network device.

9. The method of claim 1, wherein said determining that the power mode of the first wireless network device should be changed further comprises:
   determining that the ad-hoc wireless network is a continuous traffic environment;
   determining that an ad-hoc power save mode is enabled at the first wireless network device; and
   determining that the ad-hoc power save mode can be disabled at the first wireless network device.

10. The method of claim 1, wherein said transmitting the power mode switch request comprises at least one member selected from the group consisting of:
    transmitting a multicast announcement traffic indication map (ATIM) frame including a first predefined value; and
    transmitting an initial beacon frame including a second predefined value.

11. The method of claim 10, wherein the first predefined value is transmitted in a power management field of the multicast ATIM frame.

12. The method of claim 10,
    wherein the second predefined value is transmitted in a power management acceptance (PMA) field of an independent basic service set (IBSS) parameters field of the initial beacon frame.

13. The method of claim 1, further comprising:
    initiating, by the first wireless network device, a timer associated with a tolerance time interval after transmitting the power mode switch request, wherein the tolerance time interval indicates a maximum time interval for the first wireless network device to receive the power mode switch responses.

14. The method of claim 13, further comprising:
    determining the tolerance time interval based, at least in part, on a combination of a beacon interval of the first wireless network device and a number of the plurality of wireless network devices.

15. The method of claim 1, further comprising:
    determining that a tolerance time interval has elapsed, wherein the tolerance time interval indicates a maximum time interval for the first wireless network device to receive the power mode switch responses; and
    determining whether to change the power mode of the first wireless network device, in response to determining that a power mode switch response was received from each of the plurality of wireless network devices before the tolerance time interval elapsed.

16. The method of claim 15, comprising:
    transmitting the notification including the predefined value indicating to maintain the corresponding power mode of each of the plurality of wireless network devices, in response to determining that the power mode switch response was not received from each of the plurality of wireless network devices before the tolerance time interval elapsed.

17. The method of claim 1, further comprising:
    changing the power mode of the first wireless network device at a start of a next beacon interval after determining to change the power mode of the first wireless network device.

18. The method of claim 1, wherein the first wireless network device and the plurality of wireless network devices are configured to implement at least one wireless local area network (WLAN) protocol.

19. A method comprising:
    receiving, at a first wireless network device of an ad-hoc wireless network, a power mode switch request from a second wireless network device of the ad-hoc wireless network, wherein the power mode switch request includes a request for changing a power mode of the first wireless network device;
    determining whether the power mode of the first wireless network device can be changed; and transmitting a power mode switch response from the first wireless network device to the second wireless network device, wherein the power mode switch response includes a predefined value that indicates whether the power mode of the first wireless network device can be changed in response to the power mode switch request.

20. The method of claim 19, wherein said transmitting the power mode switch response comprises:
  transmitting the power mode switch response including a first predefined value in response to determining that the power mode of the first wireless network device can be changed; and
  transmitting the power mode switch response including a second predefined value in response to determining that the power mode of the first wireless network device cannot be changed.

21. The method of claim 19, further comprising:
  determining whether the ad-hoc wireless network is a continuous traffic environment.

22. The method of claim 19, wherein said receiving the power mode switch request comprises at least one member selected from the group consisting of:
  receiving a multicast announcement traffic indication map (ATIM) frame including a first predefined value, and
  receiving an initial beacon frame including a second predefined value.

23. The method of claim 19, wherein said transmitting the power mode switch response comprises:
  transmitting a beacon frame including a first predefined value in response to determining that the power mode of the first wireless network device can be changed, wherein the first predefined value is transmitted in a power management acceptance (PMA) field of the beacon frame; and
  transmitting the beacon frame including a second predefined value in response to determining that the power mode of the first wireless network device cannot be changed, wherein the second predefined value is transmitted in the PMA field of the beacon frame.

24. The method of claim 19, further comprising:
  receiving a power mode switch status from the second wireless network device, wherein the power mode switch status indicates whether a corresponding power mode of each of a plurality of wireless network devices of the ad-hoc wireless network should be changed; and
  determining whether to change or maintain the power mode of the first wireless network device based, at least in part, on the power mode switch status.

25. A first wireless network device of an ad-hoc wireless network, the first wireless network device configured to transmit a power mode switch request to a plurality of wireless network devices of the ad-hoc wireless network in response to determining that a power mode of the first wireless network device should be changed, the first wireless network device comprising:
  a processor unit; and
  a power management unit coupled with the processor unit, the power management unit configured to:
    determine whether to change the power mode of the first wireless network device based, at least in part, on power mode switch responses received from the plurality of wireless network devices responsive to the power mode switch request; and
    transmit, to the plurality of wireless network devices, a notification including a predefined value that indicates whether to change or maintain a corresponding power mode of each of the plurality of wireless network devices based, at least in part, on determining whether to change the power mode of each of the first wireless network device.

26. The first wireless network device of claim 25, wherein the power management unit is further configured to:
  determine to change the power mode of the first wireless network device, in response to receiving an acceptance power mode switch response from each of the plurality of wireless network devices;
  determine to maintain the power mode of the first wireless network device, in response to receiving a rejection power mode switch response from a second wireless network device of the plurality of wireless network devices; and
  determine to maintain the power mode of the first wireless network device, in response to determining that a power mode switch response was not received from the second wireless network device.

27. The first wireless network device of claim 25, wherein the power management unit is further configured to:
  determine to transmit the notification including a first predefined value indicating to change the corresponding power mode of each of the plurality of wireless network devices, in response to receiving an acceptance power mode switch response from each of the plurality of wireless network devices;
  determine to transmit the notification including a second predefined value indicating to maintain the corresponding power mode of each of the plurality of wireless network devices, in response to receiving a rejection power mode switch response from a second wireless network device of the plurality of wireless network devices; and
  determine to transmit the notification including the second predefined value indicating to maintain the corresponding power mode of each of the plurality of wireless network devices, in response to determining that a power mode switch response was not received from the second wireless network device.

28. The first wireless network device of claim 25, wherein the power management unit is further configured to:
  initiate a timer associated with a tolerance time interval after transmitting the power mode switch request, wherein the tolerance time interval indicates a maximum time interval for the first wireless network device to receive the power mode switch responses.

29. The first wireless network device of claim 28, wherein the power management unit is further configured to:
  determine whether to change the power mode of the first wireless network device, in response to determining that a power mode switch response was received from each of the plurality of wireless network devices before the tolerance time interval elapsed; and
  transmit the notification including the predefined value indicating to maintain the corresponding power mode of each of the plurality of wireless network devices, in response to determining that the power mode switch response was not received from each of the plurality of wireless network devices before the tolerance time interval elapsed.

30. A first wireless network device of an ad-hoc wireless network comprising:
  a processor unit; and
  a power management unit coupled with the processor unit, the power management unit configured to:
    receive a power mode switch request from a second wireless network device of the ad-hoc wireless network, wherein the power mode switch request includes a request for changing a power mode of the first wireless network device;
determine whether the power mode of the first wireless network device can be changed; and
transmit a power mode switch response from the first wireless network device to the second wireless network device, wherein the power mode switch response includes a predefined value that indicates whether the power mode of the first wireless network device can be changed in response to the power mode switch request.

31. The first wireless network device of claim 30, wherein the power management unit is further configured to:
transmit the power mode switch response including a first predefined value in response to determining that the power mode of the first wireless network device can be changed; and
transmit the power mode switch response including a second predefined value in response to determining that the power mode of the first wireless network device cannot be changed.

32. The first wireless network device of claim 30, wherein the power management unit is further configured to:
receive a power mode switch status from the second wireless network device, wherein the power mode switch status indicates whether a corresponding power mode of each of a plurality of wireless network devices of the ad-hoc wireless network should be changed; and
determine whether to change or maintain the power mode of the first wireless network device based, at least in part, on the power mode switch status.

33. A non-transitory machine-readable storage medium having machine executable instructions stored therein, the machine executable instructions comprising instructions to:
transmit, from a first wireless network device of an ad-hoc wireless network, a power mode switch request to a plurality of wireless network devices of the ad-hoc wireless network, in response to determining that a power mode of the first wireless network device should be changed;
determine whether to change the power mode of the first wireless network device based, at least in part, on power mode switch responses received from the plurality of wireless network devices responsive to the power mode switch request; and
transmit, to the plurality of wireless network devices, a notification including a predefined value that indicates whether to change or maintain a corresponding power mode of each of the plurality of wireless network devices based, at least in part, on determining whether to change the power mode of the first wireless network device.

34. The non-transitory machine-readable storage medium of claim 33, wherein said instructions to determine whether to change the power mode of the first wireless network device comprise instructions to:
determine to change the power mode of the first wireless network device, in response to receiving an acceptance power mode switch response from each of the plurality of wireless network devices;
determine to maintain the power mode of the first wireless network device, in response to receiving a rejection power mode switch response from a second wireless network device of the plurality of wireless network devices; and
determine to maintain the power mode of the first wireless network device, in response to determining that a power mode switch response was not received from the second wireless network device.

35. The non-transitory machine-readable storage medium of claim 33, wherein said instructions further comprise instructions to:
determine to transmit the notification including a first predefined value indicating to change the corresponding power mode of each of the plurality of wireless network devices, in response to receiving an acceptance power mode switch response at the first wireless network device from each of the plurality of wireless network devices;
determine to transmit the notification including a second predefined value indicating to maintain the corresponding power mode of each of the plurality of wireless network devices, in response to receiving a rejection power mode switch response at the first wireless network device from a second wireless network device of the plurality of wireless network devices; and
determine to transmit the notification including the second predefined value indicating to maintain the corresponding power mode of each of the plurality of wireless network devices, in response to determining that a power mode switch response was not received at the first wireless network device from the second wireless network device.

36. The non-transitory machine-readable storage medium of claim 33, wherein said instructions further comprise instructions to:
initiate a timer associated with a tolerance time interval after transmitting the power mode switch request, wherein the tolerance time interval indicates a maximum time interval for the first wireless network device to receives the power mode switch responses.

37. The non-transitory machine-readable storage medium of claim 36, wherein said instructions further comprise instructions to:
determine whether to change the power mode of the first wireless network device, in response to determining that a power mode switch response was received from each of the plurality of wireless network devices before the tolerance time interval elapsed; and
transmit the notification including the predefined value indicating to maintain the corresponding power mode of each of the plurality of wireless network devices, in response to determining that the power mode switch response was not received from each of the plurality of wireless network devices before the tolerance time interval elapsed.

38. A non-transitory machine-readable storage medium having machine executable instructions stored therein, the machine executable instructions comprising instructions to:
receive, at a first wireless network device of an ad-hoc wireless network, a power mode switch request from a second wireless network device of the ad-hoc wireless network, wherein the power mode switch request includes a request for changing a power mode of the first wireless network device;
determine whether the power mode of the first wireless network device can be changed; and
transmit a power mode switch response from the first wireless network device to the second wireless network device, wherein the power mode switch response includes a predefined value that indicates whether the power mode of the first wireless network device can be changed in response to the power mode switch request.

39. The non-transitory machine-readable storage medium of claim 38, wherein said instructions to transmit the power mode switch response comprise instructions to:
- transmit the power mode switch response including a first predefined value in response to determining that the power mode of the first wireless network device can be changed; and
- transmit the power mode switch response including a second predefined value in response to determining that the power mode of the first wireless network device cannot be changed.

40. The non-transitory machine-readable storage medium of claim 38, wherein said instructions further comprise instructions to:
- receive a power mode switch status from the second wireless network device, wherein the power mode switch status indicates whether a corresponding power mode of each of a plurality of wireless network devices of the ad-hoc wireless network should be changed; and
- determine whether to change or maintain the power mode of the first wireless network device based, at least in part, on the power mode switch status.

* * * * *